No. 748,760.         Patented January 5, 1904.

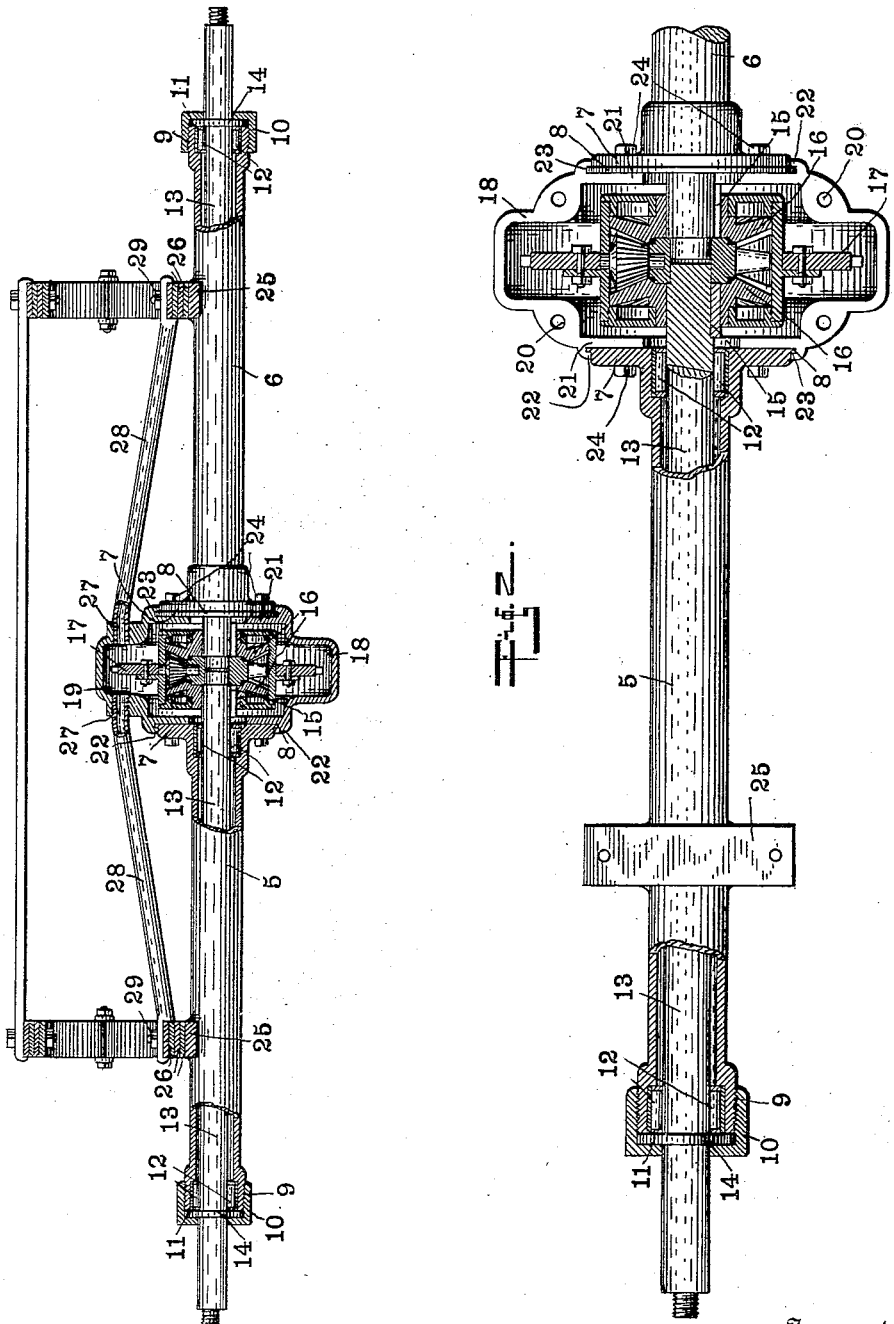

UNITED STATES PATENT OFFICE.

THOMAS J. LINDSAY, OF INDIANAPOLIS, INDIANA, ASSIGNOR, BY DIRECT AND MESNE ASSIGNMENTS, TO HIMSELF AND WILLARD HARMON.

DRIVING-AXLE STRUCTURE FOR MOTOR-VEHICLES.

SPECIFICATION forming part of Letters Patent No. 748,760, dated January 5, 1904.

Application filed August 18, 1902. Serial No. 120,086. (No model.)

*To all whom it may concern:*

Be it known that I, THOMAS J. LINDSAY, a citizen of the United States, residing at Indianapolis, in the county of Marion and State of Indiana, have invented certain new and useful Improvements in Driving-Axle Structures for Motor-Vehicles, of which the following is a specification.

The object of my invention is to provide a support for the driving-shaft of a vehicle of such form and construction that the compensating or driving gear thereon and the major portions of the shaft itself shall be inclosed in a hollow axle structure which may be rigidly attached to the body of the vehicle, and its construction, together with the construction of the driving-shaft and the compensating or other driving gear carried thereby, be such that it may be removed without dismounting the axle from the wagon-body, and such that one end or the other of the driving-shaft may be disconnected and withdrawn from the vehicle, and also such that the compensating or other driving-gear may be removed even while the weight of the vehicle is supported upon the driving shaft and the supporting-wheels carrying the same.

The accompanying drawings illustrate my invention.

Figure 1 is a vertical elevation, partly in section. Fig. 2 is a partial horizonal section of parts shown in Fig. 1 on a considerably enlarged scale.

In the drawings, 6 6 indicate a pair of tubular axles, one being preferably a counterpart of the other, the inner end of each of which is provided with an enlarged head 7, having formed on its periphery, near or at its inner end, a flange 8. The outer end of each of the tubular axles is threaded, as at 9, to receive a collar 10, provided with an internal flange 11. Suitable bearings 12 are supported in each tubular axle-section at each end to receive a driving-shaft section 13, which is provided near its outer end with a collar or peripheral flange 14, adapted to lie between the outer end of the tubular axle and the flange 11 of collar 10. At the inner end each shaft-section is provided with a keyseat 15 or other suitable means by which it may be longitudinally detachably connected to one element 16 of any desired form of compensating or other driving gear 17.

In order to connect the inner adjacent ends of the two tubular axle-sections 6 6, any suitable means may be provided; but I prefer to use a connecting-casing consisting of a pair of mating portions 18 and 19, which are connected by suitable bolts passing through openings, such as 20, so as to form an inclosing casing for the compensating or other driving gear 17. In order that a connection may be made between the casing-sections 18 and 19 and the two tubular axle-sections 6 6, such as to maintain the alinement of the axle-sections, even though one of the casing-sections 18 or 19 be removed, each of said casing-sections is formed on each face with a pair of inturned flanges 21 and 22, which are slightly separated, so as to form a groove 23, adapted to receive the flange 8 of the head 7 of either axle-section. The axle-sections are connected to the heads 7 by suitable bolts 24, which may pass through the heads into only one of the casing-sections 18 19, or, if desired, may pass from said heads into both of said casing-sections. By this construction the casing-sections 18 and 19 form a rigid and alining connection between the axle-sections 6 6 of such character, however, that one or the other of said casing-sections may be withdrawn, so as to expose the compensating or other driving gear 17 without disalining the axle-sections.

In practice I prefer to form integrally with each of the axle-sections 6 a supporting-block 25, adapted to form a support for a suitable spring 26, to which the vehicle-body (not shown) may be attached. In order to brace the axle structure, the casing-section 19 is provided at opposite sides with threaded openings 27, adapted to receive one end of a strut 28, the outer end of which embraces the spring 26, the strut, spring, and platform 25 being connected by suitable removable bolts 29. By this arrangement the shaft-sections 13 are journaled each within its hollow axle-section, and each is held axially therein by engagement of its collar 14 between the end of the hollow axle-section and the flange 11, while the compensating or other driving gear is suspended upon the adjacent ends of the shaft-sections within the casing 18 19, which rigidly connects the two axle-sections.

If for any reason it be desirable to withdraw one of the shaft-sections, it can be readily accomplished by removing the proper collar 10, when the shaft-section is free to be pulled endwise without disturbing the compensating gear or the connection between the tubular axle and the vehicle. If it be desirable to move the compensating or other driving gear for any reason, one or the other of the casing-sections 18 or 19 may be removed, preferably the casing-section 18, in which case the proper bolts 24 would be withdrawn and the bolts which connect the two casing-sections also withdrawn, whereupon the casing-section 18 may be withdrawn, allowing the casing-section 19 to remain as a rigid connection between the axle-sections, so that the driving-gear may be exposed to examination without lifting the weight of the vehicle from the supporting-wheels.

If the compensating gear is to be removed, it is merely necessary to remove the caps 10 and draw the two shaft-sections longitudinally until their adjacent ends have been withdrawn from the compensating gear, the weight of the vehicle, nevertheless, being supported upon the shaft-sections by reason of their supporting-bearings in the axle-sections.

It will be thus seen that my structure is such that the driving connection from the motor to driving-shaft may be readily examined, removed, repaired, and replaced without the necessity of the use of a jack and without dismantling or disalining the supports of the driving-shaft.

I claim as my invention—

1. In a motor-driven vehicle, the hollow axle structure adapted to support the vehicle-body, said hollow axle structure having an enlarged portion within which a compensating gear may lie and said enlarged portion consisting in part of a transversely-movable cap, a compensating gear mounted in said enlarged portion, a pair of shaft-sections rotatably mounted within the hollow structure, an axially-separable driving connection between each shaft-section and the compensating gear, and independent means for normally retaining each shaft-section against axial displacement, within this structure, said means being movable to permit the outward withdrawal of the shaft-sections from the structure.

2. In a motor-driven vehicle, the combination, with a pair of tubular axle structures, of a pair of casing-sections connecting the adjacent ends of said tubular axle structures, and one of said casing-sections being detachably connected, a pair of shaft-sections revolubly mounted in the tubular axle structure and projecting into the casing-sections, an axially-separable driving connection between the shaft-sections from which the shaft-sections may be outwardly axially withdrawn, and independent means for normally retaining the shaft-sections against axial displacement, said means being removable to permit the outward withdrawal of each shaft-section from the structure.

3. In a motor-driven vehicle, the combination, of a pair of tubular axles each provided at its inner end with a head, a pair of casing-sections forming a connecting structure which on each face is provided with an annular groove to receive the head of the adjacent tubular section, means for detachably connecting said casings together and to the axle-sections, a connecting-gear structure mounted in the hollow casing-sections, a pair of shaft-sections revolubly mounted in the hollow axle-sections and axially removably connected to the connecting-gear, and means for holding said shaft-sections in axial position within the hollow axle-sections.

4. In a motor-driven vehicle, a hollow axle structure, a pair of shaft-sections rotatably mounted therein and outwardly withdrawable therefrom, a driving connection between the adjacent ends of the shaft-sections from which the shaft-sections may be axially withdrawn, and a cap, independent of said driving connection, detachably secured to each end of the hollow axle structure and adapted to engage the adjacent shaft-section and hold the same against axial displacement.

5. In a motor-driven vehicle, a hollow axle structure, a pair of shaft-sections rotatably mounted therein and outwardly withdrawable therefrom, a driving connection between the adjacent ends of the shaft-sections from which the shaft-sections may be axially outwardly withdrawn, a collar carried by each section, and a cap detachably secured to each end of the axle structure to engage the adjacent shaft-collar to prevent axial displacement of the shaft-sections.

6. In a motor-driven vehicle, a hollow axle structure, a pair of shaft-sections rotatably mounted therein and outwardly withdrawable therefrom, a compensating gear mounted within the axle structure between the shaft-sections, a driving connection between each shaft-section and the compensating gear from which the shaft-sections may be axially withdrawn, and a cap detachably secured to each end of the hollow axle structure and adapted to engage the adjacent shaft-section and hold the same against axial displacement.

7. In a motor-driven vehicle, a hollow axle structure, consisting of two sections between which is arranged a driving connection for the shaft, the said driving connection, a pair of shaft-sections rotatably mounted within the axle structure, a separable driving connection between each shaft-section and the driving connection, each shaft-section being thus outwardly axially separable from its driving connection, and the means for normally preventing axial displacement of the shaft-sections, said means being movable to permit the outward withdrawal of its shaft-section from the structure.

8. In a motor-driven vehicle, a hollow axle structure, a pair of shaft-sections rotatably mounted therein and outwardly withdrawable therefrom, a compensating gear mounted within said axle structure between the shaft-sections, a driving connection between each shaft-section and the compensating gear from which the shaft-sections may be axially withdrawn, a collar carried by each shaft-section, and a cap detachably secured to each end of the axle structure to engage the adjacent shaft-collar to prevent axial displacement of the said shaft-sections.

9. A hollow axle structure, for motor-driven vehicles, consisting of a pair of hollow axle-casings, an intermediate larger casing connecting the adjacent ends thereof and consisting of a main portion and a removable cap, and truss-rods connected to the main portion of the intermediate casing and to the hollow axle-casings, for the purpose set forth.

In witness whereof I have hereunto set my hand and seal, at Indianapolis, Indiana, this 14th day of August, A. D. 1902.

THOMAS J. LINDSAY. [L. S.]

Witnesses:
ARTHUR M. HOOD,
JAMES A. WALSH.